United States Patent [19]
Cohen

[11] Patent Number: 5,831,627
[45] Date of Patent: Nov. 3, 1998

[54] SYSTEM AND METHOD FOR PROVIDING IMPROVED GRAPHICS GENERATION PERFORMANCE USING MEMORY LOOKUP

[75] Inventor: Ephraim Cohen, Whippany, N.J.

[73] Assignee: R/Greenberg Associates, New York, N.Y.

[21] Appl. No.: 670,518

[22] Filed: Jun. 27, 1996

[51] Int. Cl.$^6$ .................................................. G06T 11/00
[52] U.S. Cl. .............................................................. 345/431
[58] Field of Search .................................... 395/128–133; 345/428–433

[56] References Cited

U.S. PATENT DOCUMENTS 5,384,912   1/1995   Ogrinc et al. ............................ 395/164

OTHER PUBLICATIONS

Foley et al., Computer Graphics Principles and Practice, pp. 132–135 (1990).

Primary Examiner—Almis R. Jankus
Attorney, Agent, or Firm—Fish & Neave; Joseph M. Guiliano; Matthew T. Byrne

[57] ABSTRACT

A system and method are provided for implementing real-time antialiasing, transparency and motion blur of animated images displayed on a video monitor. Each pixel of an image to be displayed is associated with three attributes—a foreground color, a background color and a transparency factor. These attributes are used by a system processor to generate an index into a table of mixed colors that is stored in system memory. The table associates each combination of foreground color, background color and transparency factor with a color that appears to be a mixture of the foreground color and background color attributes for a pixel, with the weight of the mixture being defined by the transparency factor.

64 Claims, 5 Drawing Sheets

SYSTEM AND METHOD FOR PROVIDING IMPROVED GRAPHICS GENERATION PERFORMANCE USING MEMORY LOOKUP

BACKGROUND OF THE INVENTION

This invention relates generally to computer applications which use animation techniques to display moving objects on a video monitor. More particularly, this invention relates to a real-time antialiasing system and method for improving the appearance of moving objects displayed on a video monitor.

During the past decade, the graphics capabilities of personal computers and home video game units have rapidly improved. Computer applications developers naturally have taken advantage of these improvements by designing increasingly sophisticated graphically oriented computer applications, such as video games and multimedia applications which rely heavily on animation techniques to display moving objects on a video monitor. Such graphically oriented computer applications running on modern hardware platforms are now capable of displaying and animating extremely complex graphical images. These applications can generate animated objects having a realistic quality that was previously difficult to achieve.

As the quality of graphically oriented computer applications has improved, so has the ability of many users of such applications to discriminate between poor quality and high quality animation. Indeed, animation quality is believed to contribute significantly to the commercial acceptance of many video games and multimedia applications. Accordingly, computer applications developers have continued to explore ways in which animation quality can be improved.

Video monitors generally have an array of pixels which are selectively illuminated to display images on the screen. In order to display an object at a particular location on the screen, video display circuitry in a computer system connected to the video monitor selects a subset of pixels from the array, and causes the video monitor to illuminate each pixel in the subset using a color that is desired for the object being displayed. However, the ideal shape of most graphical objects does not fit perfectly within an integral number of pixels. In most cases, the ideal border of the object being displayed passes through interior portions of many of the pixels that define the perimeter of the object.

It is not possible to illuminate only a portion of a pixel. Thus, when the ideal border of an object passes through a pixel, many graphically oriented application programs either illuminate the pixel so that it corresponds to the color of the foreground object, or illuminate the pixel so that it corresponds to the color of the background. Generally, if the ideal shape of an object covers 50% or more of the area of a pixel, the pixel is illuminated to be the foreground color. Otherwise, the pixel is illuminated to be the background color. An undesirable staircase effect known as "aliasing" is the typical result when some border pixels are selected as foreground pixels and others are selected as background pixels. Aliasing detracts from the overall quality of animation.

Various techniques have been developed to deal with aliasing, but they have been difficult to implement in applications which involve animation—e.g., the display of moving (as opposed to static) objects or the display of static objects on a background that varies over time. One antialiasing technique that is commonly used for static images is known as unweighted area sampling. When this technique is used for a grey-scale object, the intensity of the illumination for a particular pixel is directly proportional to the fractional overlap of the ideal object on that pixel. For example, if the ideal object would cover 20% of the pixel's area, then the pixel is illuminated to a level that is 20% greater than the level of background illumination and 80% less than the level of foreground illumination. When viewed from a reasonable distance, objects created using this technique appear to have smoother outlines than their aliased counterparts.

The unweighted area sampling technique also can be used for static color images. Different colors are generated by typical color video monitors by mixing red, green and blue light of varying intensities. By applying the fraction that the ideal shape of the object overlaps a particular pixel to each of the red, green and blue color components, a new combination of red, green and blue light intensities may be defined which together define a mixed color for that pixel. When this technique is applied to all of the border pixels of the foreground object, the foreground object appears to have a smoother border than would otherwise be the case.

Fast antialiasing techniques are difficult to implement for animated images, especially color images, when motion is unpredictable, as it is in a video game or when objects are moved by the user of the computer program. The processing that may be required to implement antialiasing may be too intensive for many conventional personal computer and video game platforms and could thus lead to undesirable interruptions in the animation. More specifically, for each pixel that is intended to be partially covered by the ideal shape of a foreground object, the system processor may have to perform three calculations, one each for the red, green and blue color components. These calculations may include as parameters the foreground color intensity, the background color intensity and a fraction representing the amount that the ideal shape of the foreground object is intended to cover the pixel. These calculations may need to be performed repeatedly as the animation causes the foreground object to move from one location to another on the video monitor.

Even if appropriate border pixel colors were to be computed to perform antialiasing of a moving object, the computed colors may not be in the palette of available colors defined for the graphics application being executed. Many graphics applications (such as video games) which run on personal computers are limited to an eight-bit color palette (i.e., 256 colors). Thus, even if new red, green and blue light intensities were to be determined for a particular border pixel in connection with real-time antialiasing, the color corresponding to the newly computed light intensities may not exist in the color palette. Therefore, another calculation may be required to determine the color in the color palette that is closest to the computed color. This additional processing overhead is undesirable because it may interfere with other processing activities, and it may potentially lead to interruptions in the movement of the object.

It would therefore be desirable to provide a system and method for implementing real-time antialiasing in order to improve the appearance of animated images displayed on a video monitor.

It has also been difficult to animate partially transparent, moving objects, such as shadows, on a video monitor. Generally, moving shadows displayed on a video monitor are opaque, thus obscuring any background detail that may be present beneath the shadow. This, of course, is unnatural.

Motion blur likewise requires partial transparency—the object being animated is "stretched" in the direction of motion, and its leading and trailing edges are rendered with varying transparency.

The reasons for the difficulties associated with displaying partially transparent, animated objects such as shadows and motion blur are essentially the same as those described above in connection with real-time antialiasing. The appropriate color for each pixel in the partially transparent object may be determined as a function of the color of the foreground object, the background color, and a transparency factor. The transparency factor defines the extent to which the background detail is intended to be visible through the foreground object. From a computational standpoint, the transparency factor is similar to the fractional overlap described above in connection with antialiasing. Like antialiasing, the computation of the appropriate color for a pixel of a partially transparent object may require three calculations—one each for the red, green and blue color components—each time the object moves from one location to another. Moreover, the appropriate color for a particular pixel may not be included in the color palette for the application program being executed, thus necessitating further calculation to determine the closest available color. It may be difficult for conventional hardware platforms to repeatedly perform these calculations while maintaining uninterrupted movement of the partially transparent object.

It would therefore be desirable to provide a system and method that is capable of displaying partially transparent, animated objects, such as shadows and motion blur, on a video monitor.

SUMMARY OF THE INVENTION

The above-identified difficulties associated with displaying moving objects on a video monitor are overcome by this invention. More particularly, this invention provides a real-time antialiasing system and method that significantly improves the appearance of moving objects that are displayed during the execution of graphically oriented application programs such as video games and multimedia applications.

The real-time antialiasing system and method of the present invention advantageously can be implemented using readily available, conventional personal computer hardware that is capable of executing graphically oriented computer applications. The system preferably includes a microprocessor, random access memory (RAM), a removable media I/O device (e.g., a floppy disk drive, tape drive, compact disk read only memory (CD-ROM) drive, etc.), a user input device (e.g., a keyboard, mouse, microphone, joystick, trackball, etc.), a video controller (e.g., a graphics card), a hard disk drive, and a video monitor (e.g., a computer monitor or television). Alternatively, the principles of the present invention may be implemented on other suitable hardware platforms such as home video game systems.

The system and method of the present invention accomplish real-time antialiasing while avoiding the need to perform processing intensive computations while a displayed object is being moved from one location to another on the video monitor, or while the background detail displayed on the video monitor is changing. By avoiding these computations, this invention reduces the likelihood of undesirable interruptions in the animation while the foreground object moves from one location to another or while the background detail changes. These calculations are replaced by a rapid, indexed search through a table that is preferably stored in the RAM. This table needs to be created only once each time that the graphics application is executed—preferably soon after the graphics application is invoked by the user.

In order to perform real-time antialiasing, the system and method of this invention preferably make use of three attributes that are associated with each pixel to be used to display an animated image on a video monitor. These attributes are a foreground color, a background color and a transparency factor. The foreground color for a particular pixel is the color of a foreground object positioned at that pixel location at a particular point in time. The background color for a particular pixel is the color of the background at that pixel location. The background color may be understood as the color a particular pixel would be if the ideal shape of the foreground object did not occupy any portion of that pixel location.

The transparency factor is a fractional value that defines a desired mixture of the foreground color and the background color for a particular pixel. This invention utilizes the transparency factor in two contexts. For the purpose of implementing real-time antialiasing, the transparency factor for a particular pixel defines the fractional overlap of the ideal shape of the foreground object on that pixel. For example, if the ideal border of the foreground object would divide a particular pixel in half, then the transparency factor would be 0.5 for that pixel. This would indicate that half of the pixel would be occupied by the shape of the ideal foreground object and the other half would be background. If, for example, the ideal shape of the foreground object would overlap 75% of the pixel, the transparency factor would be 0.75. A transparency factor of 1.0 for a particular pixel indicates that the pixel should be completely covered by the foreground object. A transparency factor of 0.0 for a particular pixel indicates that no portion of the ideal shape of the foreground object should occupy the pixel, and the pixel is thus entirely part of the background.

The system and method of the present invention use the foreground color, background color and transparency factor to generate an index into the above-mentioned table stored in RAM. This table correlates each foreground color, background color and transparency factor combination to a desired mixed color that preferably has the appearance of being a mixture of the foreground color and the background color. The index is preferably generated for all pixels in the displayed animated image that do not have a transparency factor of 0.0 (all background) or 1.0 (all foreground). These pixels would include pixels that the ideal border of the foreground object would pass through.

For each pixel that the ideal shape of the foreground object would partially overlap, a mixed color is retrieved from the table using the computed index. This is an extremely fast process, and it can thus be performed without introducing delays into the animation. By illuminating the partially overlapped pixels (e.g., the border pixels that define the perimeter of the foreground object) using the retrieved mixed colors, antialiasing of the moving foreground object is achieved.

The table used by the system and method of the present invention is preferably indexed in a manner that allows rapid searching as a function of the foreground color, background color and transparency factor for each partially overlapped pixel. Moreover, the table only includes colors that are in the palette of colors available for the graphics application being executed. There is thus no need to determine which color in the color palette is closest to the retrieved mixed color for each pixel. This further reduces the likelihood of introducing delays in the animation.

The other context in which the foreground color, background color and transparency factor attributes are used in accordance with the principles of this invention is in the display of partially transparent objects such as shadows and motion blur. In this context, the transparency factor may be considered an indication of the level of transparency that is desired at a particular pixel location. For example, if a particular pixel occupied by a foreground object should be 25% transparent (meaning that 75% of the background should show through), then the transparency factor would be 0.25. A transparency factor of 1.0 means that the pixel is opaque, and the pixel should thus be illuminated to be the foreground color. A transparency factor of 0.0 indicates that the pixel is completely transparent, and the pixel should thus be illuminated to be the background color.

For pixels intended to be partially transparent (i.e., pixels having transparency factors other than 0.0 and 1.0), indices into the table of mixed colors are generated using the foreground colors, background colors and transparency factors for those pixels. These indices are used to retrieve mixed colors that are used to illuminate the partially transparent pixels. The result is a foreground object that appears partially transparent, thus allowing background detail to show through the object.

BRIEF DESCRIPTION OF THE DRAWINGS

The above and other advantages of the present invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
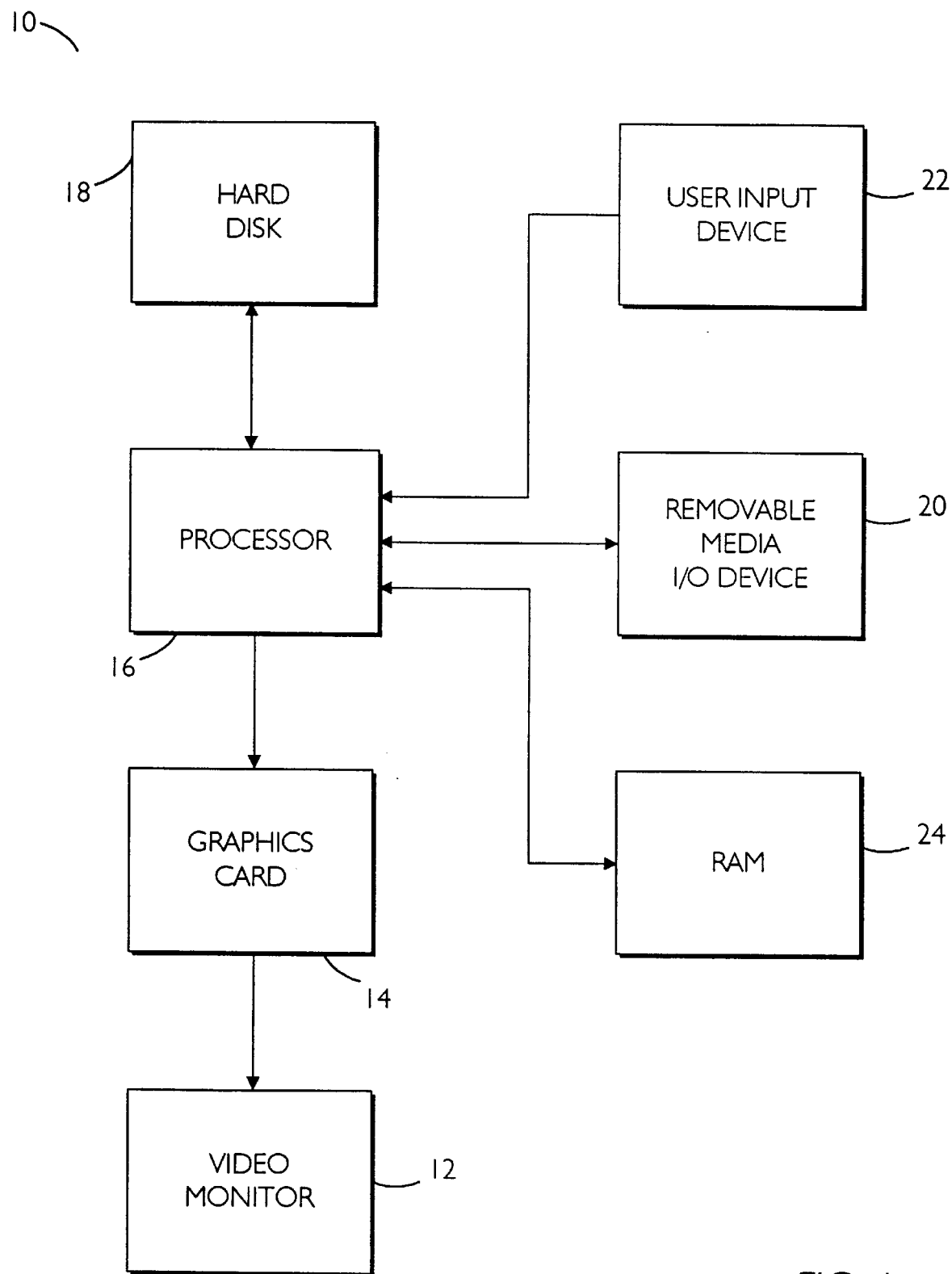
FIG. 1 is a simplified block diagram representing a hardware platform that may be used to implement real-time antialiasing and partially transparent objects on a video monitor in accordance with the principles of the present invention.

Referring to FIG. 1, a simplified block diagram is shown which represents a computer system 10 that may be used to implement real-time antialiasing and partially transparent objects in accordance with the principles of the present invention. The components of the computer system 10 are conventional components that are commonly found in personal computer systems. The system 10 has a video monitor 12, which may be a cathode ray tube ("CRT"), plasma screen, liquid crystal display ("LCD") or other suitable video monitor. The video monitor 12 can also be a conventional television set. Preferably, the video monitor 12 is a conventional computer monitor having a resolution of at least 480×640 pixels. The video monitor 12 is driven by a conventional graphics card 14 which is preferably capable of supporting the simultaneous display of at least 256 colors.

The computer system 10 is controlled by a processor 16. The processor 16 is preferably a microprocessor that has sufficient computational power to cause the graphics card 14 to display animated objects on the video monitor 12. A suitable microprocessor is the 80386 microprocessor available from Intel Corporation of Santa Clara, Calif.

The computer system 10 also includes conventional components for receiving and storing information such as application programs and data. The system 10 may include, for example, a conventional hard disk drive 18 and at least one removable media I/O device 20. Devices which are suitable for use as the removable media I/O device 20 may include, for example, a floppy disk drive, a tape drive or a compact disk read-only memory (CD-ROM) drive. The removable media device 20 may be used by the system 10 to receive graphically oriented applications programs, such as video games and multimedia applications, which include instructions for generating the display of animated objects on the video monitor 12. These application programs may be loaded into the hard disk 18 in a conventional manner in order to improve the speed of program execution.

The computer system 10 also preferably includes at least one user input device 22. Devices which are suitable for use as the user input device 22 include, for example, a keyboard, mouse, trackball, joystick or microphone. The processor 16 is configured to receive instructions from the user input device 22, which may include instructions that cause an application program being executed by the processor 16 to move an object displayed on the video monitor 12 from one location to another, or instructions to change the background detail displayed on the video monitor 12.

The computer system 10 also includes random access memory (RAM) 24. The RAM 24 is used in a conventional manner to store at least portions of an application program being executed by the processor 16, as well as data that may be generated or used by the processor 16 while executing an application program. In accordance with the principles of this invention, the RAM 24 is also used to store information that allows the computer system 10 to implement real-time antialiasing and partially transparent objects on the video monitor 12. More particularly, the information stored in the RAM 24 allows the processor 16 to perform rapid, indexed searches through a table of such information, instead of a series of processing intensive calculations, in order to determine the colors required to generate antialiased or partially transparent objects in real time.

Although the preferred hardware platform for implementing the invention has been described as a personal computer, it should be understood that the invention can also be implemented on other hardware platforms, such as a conventional home video game platform. It should also be understood that variations to the block diagram shown in FIG. 1 may be made without departing from the spirit of the invention. For example, the functions performed by both the graphics card 14 and the processor 16 may be performed by a single integrated circuit. Alternatively, many of the processing steps described below as being performed by the processor 16 may instead be performed by a video display processor provided on the graphics card 14. Moreover, the graphics card 14 may include memory that may be used to store some or all of the data described below as being stored in the RAM 24.

Figure 2:
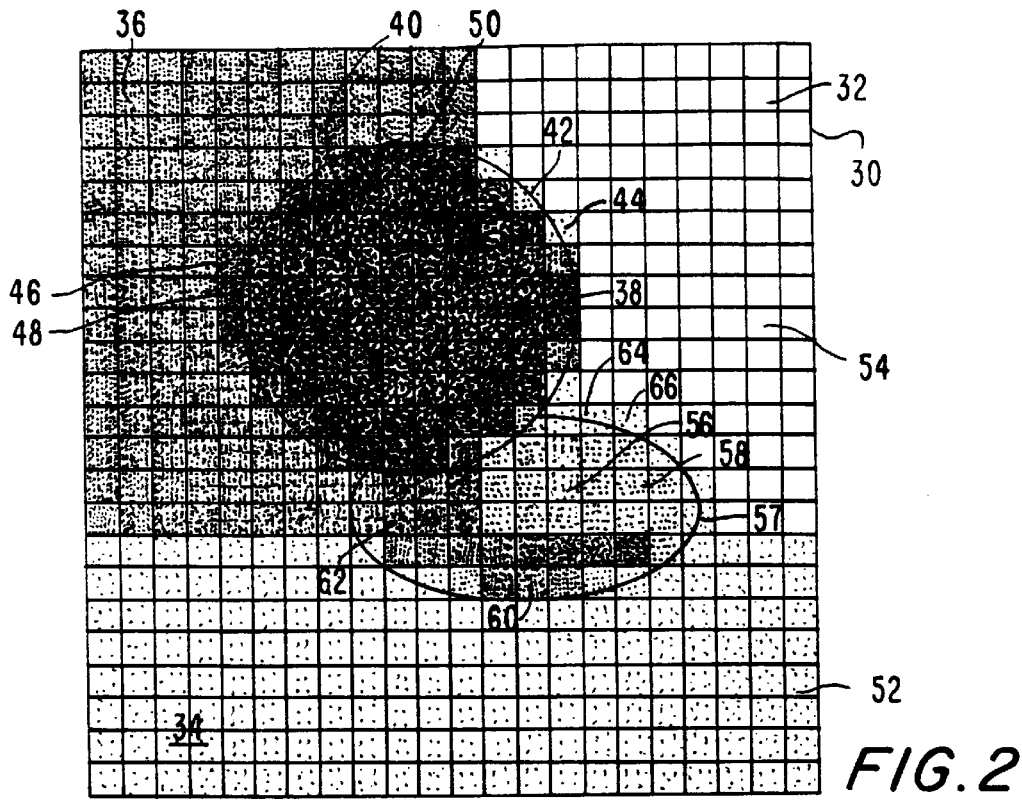
FIG. 2 depicts an antialiased foreground object and a partially transparent object as they may appear on the video monitor of FIG. 1 in accordance with the principles of the present invention.
Figure 3:
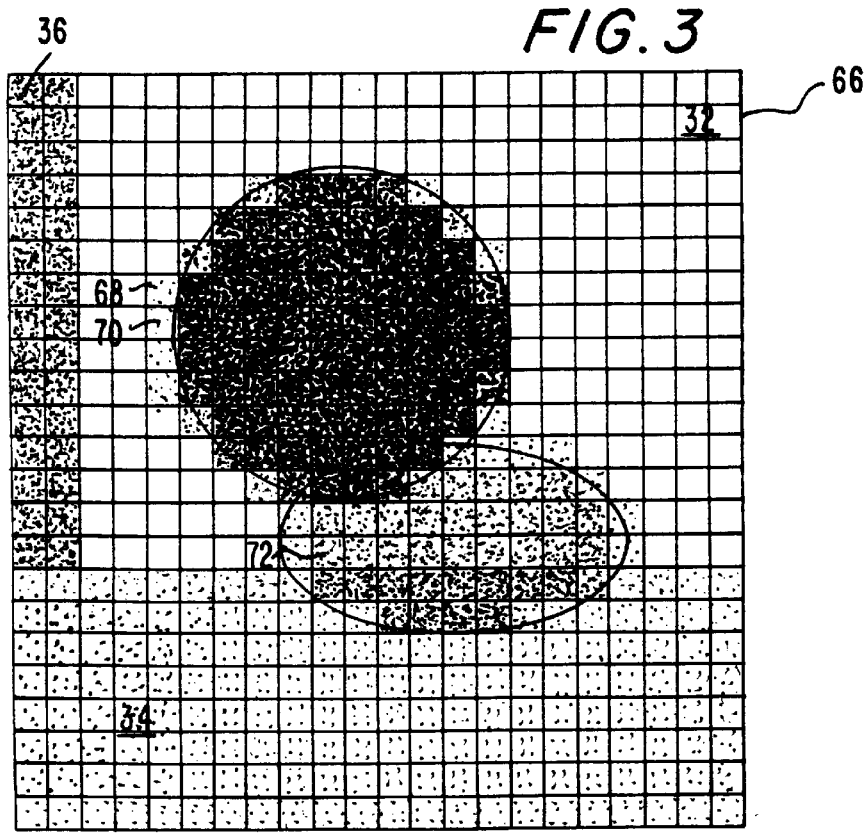
FIG. 3 depicts the antialiased foreground object and the partially transparent object of FIG. 2 as they may appear on a different background in accordance with the principles of the present invention.

The manner in which the present invention implements real-time antialiasing and partially transparent objects on the video monitor 12 may be understood by reference to the screen examples shown in FIGS. 2 and 3. It should be noted, however, that the screen examples of FIGS. 2 and 3 depict only a small portion of a full screen display that may appear at any given time on the video monitor 12 (FIG. 1). It should also be noted that the size of the pixels represented by the grid patterns shown in FIGS. 2 and 3 is greatly exaggerated in order to facilitate the explanation of the invention. It should further be noted that, although the images shown in FIGS. 2 and 3 are in grey-scale, the principles of the invention apply equally as well to color images, and indeed the invention offers significant advantages when used in connection with color images. The various shades of grey shown in FIGS. 2 and 3 may thus be considered different colors.

The screen example shown in FIG. 2 depicts an image 30 comprising a two-dimensional array of pixels that includes three distinct regions each having different background colors. A first region 32 is shown to have a white background, a second region 34 is shown to have a light grey background, and a third region 36 is shown to have a dark grey background. The image 30 also includes a simple foreground object 38 having an ideal border 40. The ideal shape of the object 38, as defined by the ideal border 40, is a circle.

As shown in FIG. 2, the ideal border 40 of the object 38 passes through a plurality of border pixels, including for example, border pixels 42, 44, 46 and 48. The ideal border 40 completely surrounds many other pixels, referred to as interior pixels, including for example, an interior pixel 50.

The interior pixels and border pixels together form the object 38. The border pixels of the object 38, including for example the border pixels 42, 44, 46 and 48, exhibit the effect of antialiasing performed in accordance with the principles of this invention. Specifically, the various border pixels are colored differently in order to reduce the staircase effect that occurs as a consequence of the ideal border 40 passing through the border pixels.

In order to perform antialiasing of the object 38, the processor 16 (FIG. 1) makes use of three attributes that are associated with each pixel of the image 30. The first attribute for a particular pixel is referred to as the foreground color, which is the intended color of the foreground object (in this case the object 38) at that pixel location. For simplicity, all of the pixels of the object 38 have been assigned the same foreground color (i.e., black in this example), however, it should be understood that the various pixels forming the object 38 could have been assigned different foreground colors.

The second attribute for a particular pixel is referred to as the background color, which is the color of the background at that pixel location. With respect to the object 38, the background color of several pixels, including for example, the pixels 42 and 44, is the color of the region 32, which in this case is white. The background color of other pixels of the object 38, such as the pixels 46, 48 and 50, is the color of the region 36, which in this case is dark grey.

The third attribute for a particular pixel is referred to as a transparency factor. In general, the transparency factor is a fractional value that defines a desired mixture of the foreground color and the background color for a particular pixel. For the purpose of implementing real-time antialiasing, the transparency factor for a particular pixel defines the fractional overlap of the ideal shape of the foreground object on that pixel. It has been determined that a set of nine transparency factors ranging from 0.0 to 1.0 (i.e., 0.0, 0.125, 0.25, 0.375, 0.5, 0.625, 0.75, 0.875 and 1.0) are sufficient to achieve the benefits of the invention when an eight-bit color palette is used. However, a more or less granular set of transparency factors may be used instead.

The assignment of transparency factors to various pixels may be understood by reference to the image 30. For example, the pixel 42, which is approximately 50% covered by the ideal shape of the object 38, may be assigned a transparency factor of 0.5. The ideal shape of the object 38 overlaps less of the pixel 44, and thus the pixel 44 may be assigned a transparency factor of 0.25. The pixels 46 and 48 may be assigned transparency factors of 0.125 and 0.25, respectively, based on the extent to which the ideal shape of the object 38 overlaps those pixels. The pixel 50, which is completely within the ideal border 40, is assigned a transparency factor of 1.0, indicating that the pixel 50 should be illuminated to be the foreground color. Pixels which do not form part of the object 38 at a particular time, such as the pixels 52 and 54, are assigned transparency factors of 0.0 to indicate that these pixels should be illuminated to be the background color.

The foreground color, background color and transparency factor attributes are used by the processor 16 (FIG. 1) to perform antialiasing of the object 38. For each pixel having a transparency factor other than 0.0 or 1.0, the processor 16 (FIG. 1) generates an index that is a function of the foreground color, background color and transparency factor for the pixel. This index is used by the processor 16 (FIG. 1) to perform a rapid search through a table stored in the RAM 24 (FIG. 1). This table correlates the foreground color, background color and transparency factor for a particular pixel to a mixed color that is suitable for that pixel. The various shades of grey used for the border pixels 42, 44, 46 and 48 are indicative of the different colors that may be retrieved from the table based on different combinations of foreground colors, background colors and transparency factors.

It is not necessary to search the table of mixed colors when a transparency factor for a pixel is either 0.0 or 1.0. When the transparency factor is 0.0, as is the case for the pixels 52 and 54, the processor 16 (FIG. 1) recognizes the pixel to be entirely part of the background, and it is thus illuminated to be the background color. When the transparency factor is 1.0, as is the case for the pixel 50, the processor 16 (FIG. 1) recognizes the pixel to be completely within the ideal border of the foreground object, and it is thus illuminated to be the foreground color.

The image 30 also includes a second object 56 having an ideal border 57. In this example, the object 56 is a shadow cast by the object 38. Unlike the opaque shadows generated by conventional graphically oriented application programs, the object 56 is partially transparent. The partial transparency of the object 56 allows the viewer to see background detail that may be present beneath the object.

In the example shown in FIG. 2, the use of partial transparency in accordance with this invention allows the viewer to recognize that the object 56 is a shadow cast on a multi-colored background. For example, the portion of the object 56 that occupies a pixel 58 is cast on the region 32 which, as explained above, has a white background color. Thus, the color of the pixel 58 is lighter than the color of, for example, a pixel 60, because the portion of the object 56 that occupies the pixel 60 is cast on a darker background (i.e., the light grey background region 34). The color of a pixel 62 is even darker, because the background region 36 is darker than the background region 34.

In order to create partially transparent objects like the object 56, the present invention makes use of the same three attributes discussed above in connection with antialiasing—namely, the foreground color, background color and transparency factor assigned to each pixel in the image 30. It has been determined that a suitable foreground color for all pixels that contribute to a shadow is black, although other colors may be used instead. The transparency factor for pixels that are completely bounded by the ideal border (e.g., the ideal border 57) of the shadow is preferably set to 0.5. This would be the case, for example, for the pixels 58, 60 and 62. This combination of foreground color and transparency factor provides sufficient darkening of the background to create the appearance of a partially transparent shadow.

As shown in FIG. 2, the object 56 includes border pixels, such as the pixels 64 and 66, through which the ideal border 57 of the object 56 passes. Antialiasing is performed for the object 56 preferably by reducing the transparency factor to 0.375, 0.25 or 0.125, depending on the extent to which the shape of the ideal object 56 overlaps the border pixels.

Like antialiasing, the colors that are used to create the partially transparent object 56 are retrieved from the table of mixed colors that is preferably stored in the RAM 24 (FIG. 1). For each pixel forming part of the object 56, the processor 16 (FIG. 1) generates an index into the table as a function of the foreground color, background color and transparency factor attributes for the pixel. The computed index points to a color that causes the pixel to be illuminated darker than the background color. By doing this for all of the pixels of the object 56, the appearance of transparency is achieved.

By making use of a rapid, indexed search for colors through a table stored in the RAM 24, the present invention is able to implement antialiasing and partial transparency for images that include moving foreground objects and/or varying backgrounds. This can significantly improve the appearance of animation that may be presented on the video monitor 12 (FIG. 1).

As the processor 16 (FIG. 1) executes a graphically oriented application program, the images that appear on the video monitor 12 (FIG. 1) may change over time, sometimes rapidly. Such changes may include the movement of a foreground object (such as the object 38) or changes in the appearance of the background. In order to display such changes, the foreground color, background color and transparency factor attributes for the pixels used to create the images to be displayed on the video monitor 12 (FIG. 1) are changed by the processor 16 (FIG. 1) in accordance with instructions provided by the application program. The information defining the foreground colors, background colors and transparency factors for images being displayed on the video monitor 12 (FIG. 1) are preferably stored in the RAM 24 (FIG. 1).

FIG. 3 depicts an image 66 that illustrates how the objects 38 and 56 may appear after they have moved away from the background region 36 and further into the background region 32. The image 66 shows that when the object 38 moves further into the background region 32, many of the border pixels of the object 38 are illuminated to be a lighter color than they were in the image 30 (FIG. 2). For example, pixels 68 and 70 (which are occupied by the portions of the object 38 that previously occupied the pixels 46 and 48 (FIG. 2)) are lighter than the pixels 46 and 48 (FIG. 2) in order to take into account the lighter background color of the region 32. The lighter colors for the pixels 68 and 70 are obtained from the table of mixed colors stored in the RAM 24 (FIG. 1) by using indices that are different than the indices used for the pixels 46 and 48. The indices are different because the background color attributes for the pixels 68 and 70 are different than the background color attributes for the pixels 46 and 48. Similarly, as the shadow object 56 is moved further into the region 32, several pixels that form the object 56 in the image 66 are illuminated to be lighter than the corresponding pixels in the image 30 (FIG. 2). For example, the color of the pixel 72 is lighter than the color of the pixel 62 (FIG. 2).

Figure 4:
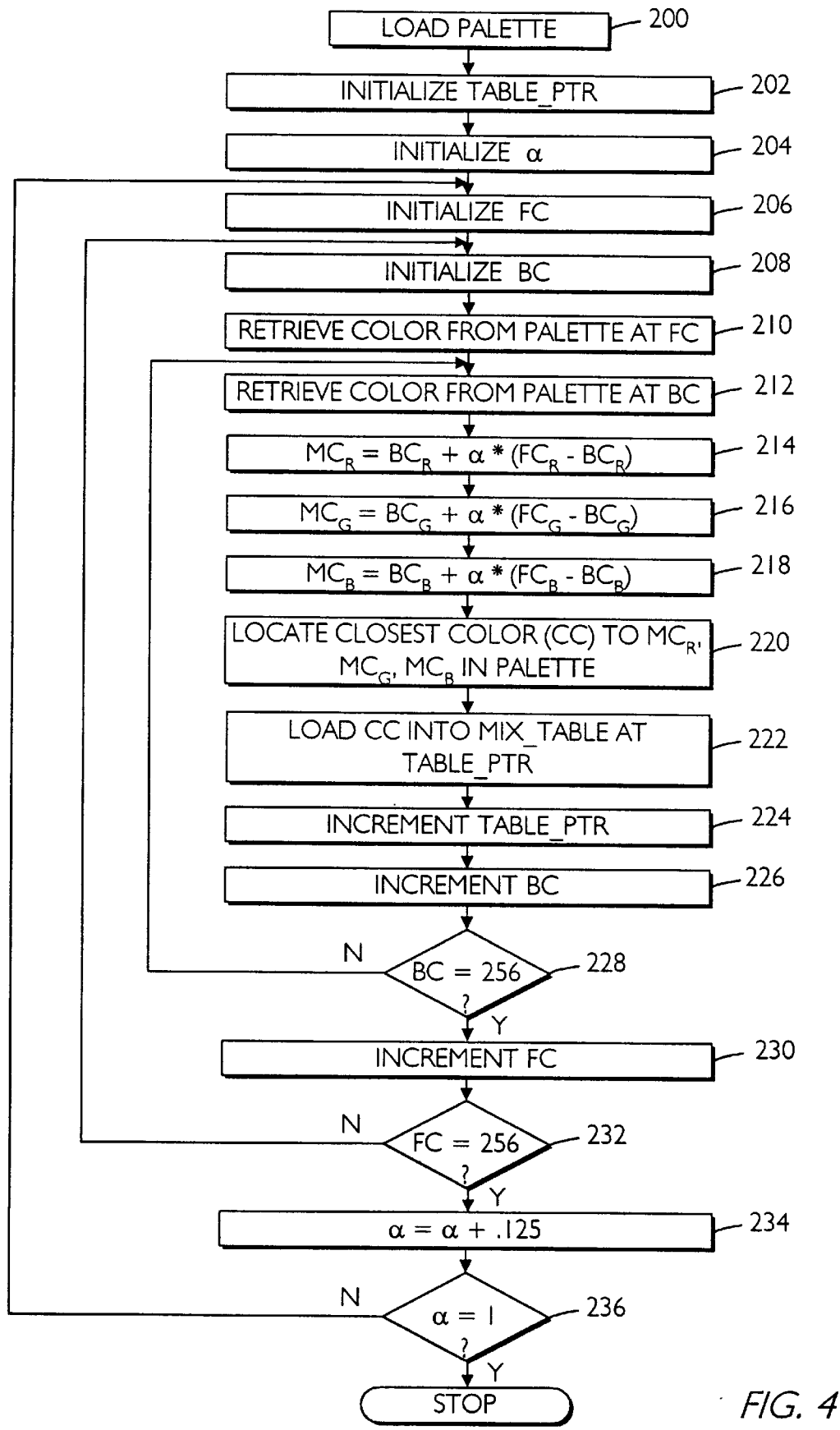
FIG. 4 is a flowchart representing steps that may be performed by the processor of FIG. 1 to create a table in the memory of FIG. 1 that correlates combinations of foreground colors, background colors and transparency factors to mixed colors for use in implementing real-time antialiasing and partially transparent objects in accordance with the principles of the present invention.

Referring now to FIG. 4, a logic flow diagram is described which represents a sequence of steps performed by the processor 16 (FIG. 1) to generate the table that correlates combinations of foreground colors, background colors and transparency factors to mixed colors that are used to implement real-time antialiasing and partially transparent objects. The table is preferably stored in the RAM 24 (FIG. 1). The processor 16 (FIG. 1) preferably generates the table only once each time the user invokes an application program that utilizes the principles of this invention. In the preferred embodiment described herein, the table is not excessively large—it is 393,216 bytes long, which is about the size of a single 480×640 pixel image. However, if the creation of this table is deemed too slow for a particular application (e.g., if a larger table is desired), it may be stored in a file and loaded into the RAM 24 (FIG. 1) from that file when needed.

The sequence starts at step 200 where the processor 16 (FIG. 1) loads a table (PALETTE) with values representing the red, green and blue light intensities for colors selected to be included in the palette of colors available for the graphically oriented application program being executed. Most computer monitors are capable of displaying millions of different colors; however, most application programs are limited to a much smaller color palette selected from among those millions of colors. Preferably, the table PALETTE is loaded with values representing the red, green and blue light intensities for 256 colors (i.e., an eight-bit color palette). These colors may be used as either background colors or foreground colors in connection with displaying animated images on the video monitor 12 (FIG. 1).

At step 202, the processor 16 (FIG. 1) initializes a pointer (TABLE_PTR) that is used to step through memory locations in the RAM 24 (FIG. 1) as the processing sequence shown in FIG. 4 is used to create the table (MIX_TABLE) that correlates combinations of foreground colors, background colors and transparency factors to mixed colors. At step 204, the transparency factor ($\alpha$) is initialized to 0.125. At step 206, the foreground color (FC) is initialized to 0 (which corresponds to the first color in the PALETTE table).

At step 208, the background color (BC) is also initialized to 0. At step 210, the processor 16 (FIG. 1) retrieves from the PALETTE table, the red ($FC_R$), green ($FC_G$) and blue ($FC_B$) light intensities for the color identified by the current value of FC. At step 212, the processor 16 (FIG. 1) retrieves from the PALETTE table, the red ($BC_R$), green ($BC_G$) and blue ($BC_B$) light intensities for the color identified by the current value of BC.

At steps 214, 216 and 218, the processor 16 (FIG. 1) computes a mixed color (MC) using the retrieved red, green and blue light intensities for the current foreground color (FC) and background color (BC). The red component ($MC_R$) is determined at step 214 in accordance with the equation:

$$MC_R = BC_R + \alpha^*(FC_R - BC_R).$$

The green component ($MC_G$) and blue component ($MC_B$) of the mixed color are similarly computed at steps 216 and 218, respectively.

At step 220, the processor 12 (FIG. 1) searches the PALETTE table for the color (CC) having red, green and blue light intensities that are the closest to those computed for $MC_R$, $MC_G$ and $MC_B$ at steps 214, 216 and 218, respectively. This search may be performed in any conventional manner, such as by taking the least sum of the absolute values of the color differences. At step 222, the processor 16 (FIG. 1) stores the color CC in the table MIX_TABLE at the location pointed to by TABLE_PTR.

At step 224, the processor 16 (FIG. 1) increments TABLE_PTR. At step 226, the processor 16 (FIG. 1) increments BC. At test 228, the processor 16 (FIG. 1) determines if BC is greater than the largest color value stored in the PALETTE table (in this case, 255). If not, the processor 16 (FIG. 1) loops back to step 212. If it is, then step 230 is performed to increment FC.

At test 232, the processor 16 (FIG. 1) determines if FC is greater than the largest color value stored in the PALETTE table. If not, the processor 16 (FIG. 1) loops back to step 208. If it is, then step 234 is performed to increase the current value of a by 0.125. Then at test 236, the processor 16 (FIG. 1) determines if α has reached its maximum value of 1.0. If not, the processor 16 (FIG. 1) loops back to step 206. If it has, then the processing sequence of FIG. 4 terminates, indicating that the table MIX_TABLE has been filled with mixed colors, and is therefore ready to be used in connection with real-time antialiasing and the display of partially transparent objects.

Figure 5:
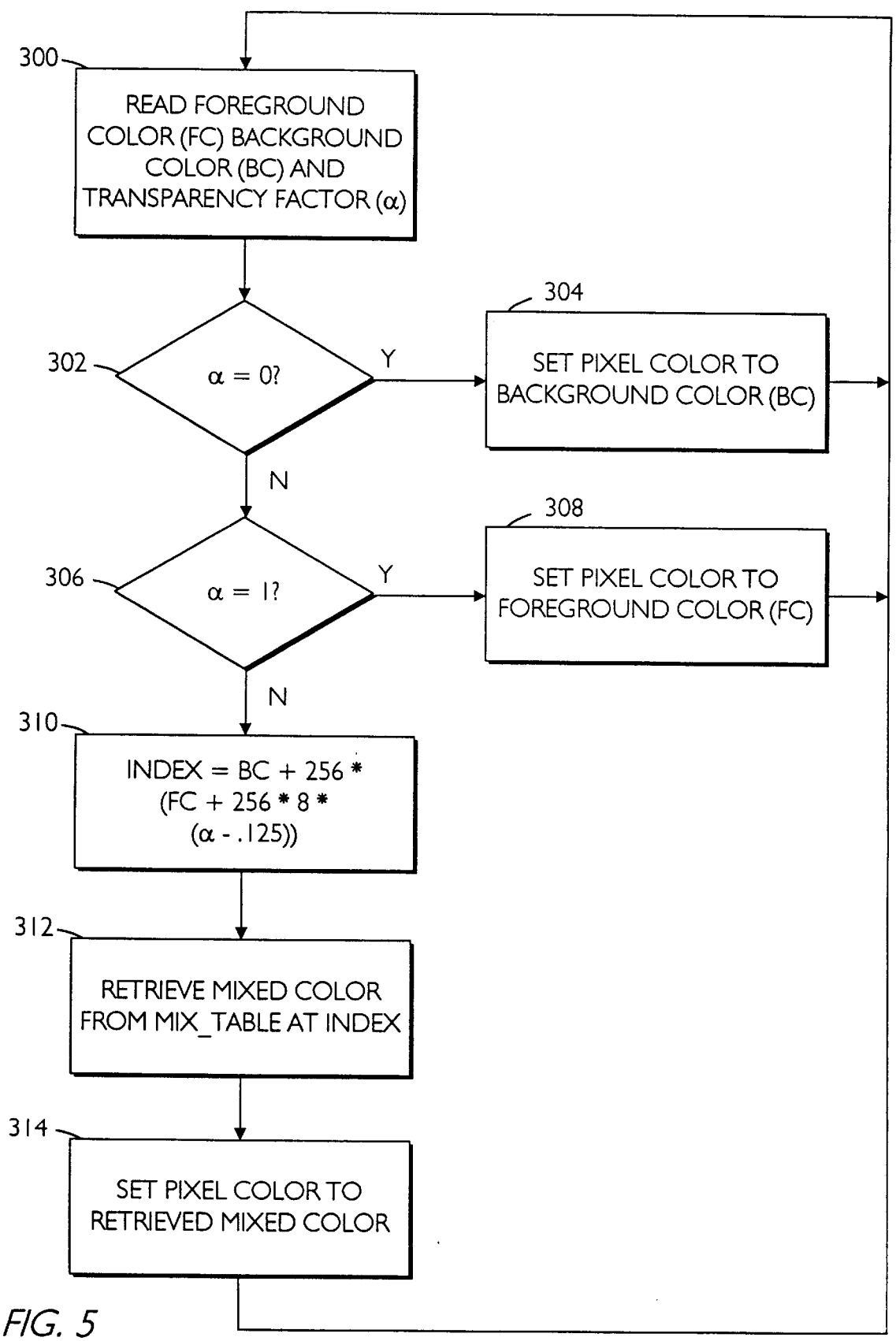
FIG. 5 is a flowchart representing steps performed by the processor of FIG. 1 to retrieve mixed colors from the table of mixed colors stored in the memory of FIG. 1 to implement real-time antialiasing and partially transparent objects in accordance with the principles of the present invention.

Referring now to FIG. 5, a logic flow diagram is described which represents a sequence of steps performed by the processor 16 (FIG. 1) in order to determine a mixed color for a particular pixel of an image displayed on the video monitor 12 (FIG. 1). The sequence of steps shown in FIG. 5 is preferably executed in a continuous loop for the processor 16 (FIG. 1) to generate images on the video monitor 12 (FIG. 1) that include antialiased and/or partially transparent objects.

The sequence starts at step 300 where the processor 16 (FIG. 1) reads from the RAM 24 (FIG. 1), the foreground color (FC), background color (BC) and transparency factor (α) attributes associated with a pixel to be used to display an image on the video monitor 12 (FIG. 1). At test 302, the processor 16 (FIG. 1) determines if α is set to 0.0 for the current pixel. If it is, the processor 16 (FIG. 1) sets the color for the current pixel to the color defined by the background color attribute (BC) at step 304.

If α is not 0.0, the processor 16 (FIG. 1) performs test 306 to determine if α is set to 1.0 for the current pixel. If it is, the processor 16 (FIG. 1) sets the color for the current pixel to the color defined by the foreground color attribute (FC) at step 308.

If α is not 0.0 or 1.0, the processor 16 (FIG. 1) performs step 310 to generate an index into the table stored in the RAM 24 (FIG. 1). The index is determined in accordance with the equation:

$$INDEX = BC + 256^*(FC + 256^*8^*(\alpha - 0.125))$$

At step 312, the processor 16 (FIG. 1) uses the index generated at step 310 to retrieve a mixed color from the table MIX_TABLE stored in the RAM 24 (FIG. 1). The mixed color retrieved from the table MIX_TABLE preferably has the appearance of being a mixture of the colors defined by the foreground color and the background color attributes for the current pixel, with the weight of the mixture being defined by the transparency factor attribute. At step 314, the processor 16 (FIG. 1) sets the color for the current pixel to the mixed color retrieved at step 312.

After step 314, the processor 16 (FIG. 1) loops back to step 300 to repeat the sequence for the next pixel. The sequence is repeated for each pixel used to display an image on the video monitor 12 (FIG. 1), and continuously thereafter as new images are displayed on the video monitor 12 (FIG. 1). Note that because most pixels of an image are either completely transparent or completely opaque, the speed of this operation may be greatly increased by using run-coding of the transparency factors.

Figure 6:
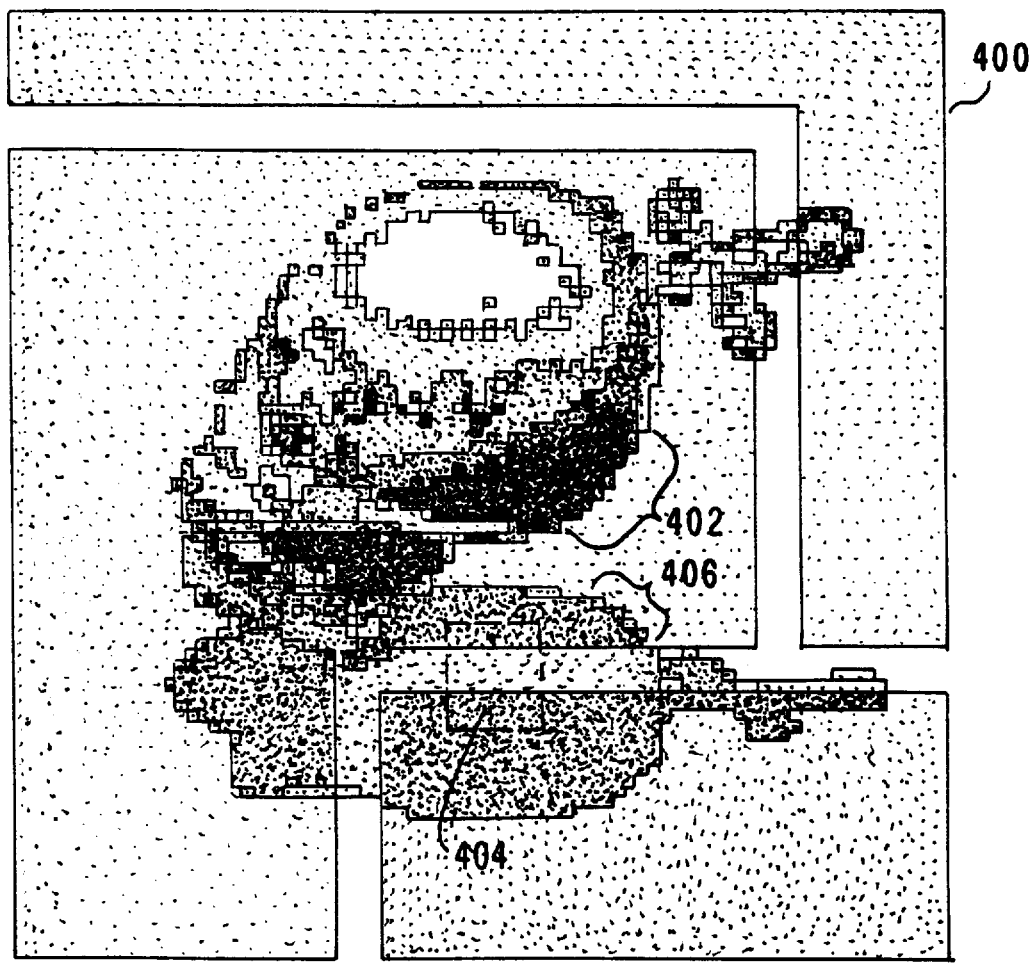
FIG. 6 is an image that includes an antialiased foreground object and a partially transparent object in accordance with the principles of the present invention.

The principles described herein may be used to generate complex images for display in connection with the execution of graphically oriented application programs such as video games and multimedia applications. An example of a complex image 400 is shown in FIG. 6. The image 400 includes a foreground object having an antialiased border, as shown, for example, in a region 402. The image 400 also includes a partially transparent object (in this case a shadow) through which background detail may be seen, as shown, for example, in a region 404. The image 400 also illustrates the use of antialiasing with a partially transparent object, as shown, for example, in a region 406.

Thus a system and method are provided for implementing real-time antialiasing, partially transparent objects and motion blur on a video monitor. One skilled in the art will appreciate that the present invention can be practiced by other than the described embodiments, which are presented for purposes of illustration and not of limitation, and the present invention is limited only by the claims which follow.

What is claimed is:

1. A graphic display system for setting a pixel color definition of at least one of a plurality of pixels that form a graphical image, the at least one of the plurality of pixels each having a foreground color definition, a background color definition, and a transparency factor, the system comprising:

a memory that simultaneously stores a plurality of definitions of mixed colors, each of the plurality of definitions of mixed colors corresponding to a combination of at least one of a plurality of definitions of foreground colors, at least one of a plurality of definitions of background colors, and at least one of a plurality of transparency factors; and a processor that causes the plurality of definitions of mixed colors to be stored in the memory, that forms an index using a combination of the foreground color definition, the background color definition, and the transparency factor of the at least one of the plurality of pixels of the graphical image, that retrieves from the memory a selected definition of the plurality of definitions of mixed colors using the index, and that sets the pixel color definition of the at least one of the plurality of pixels to be the selected definition of the plurality of definitions of mixed colors.

2. The system of claim 1, wherein:

at least one of the plurality of pixels is a foreground pixel; and the processor sets the pixel color definition of the foreground pixel to be the foreground color definition of the foreground pixel without retrieving any of the plurality of definitions of mixed colors from the memory when the transparency factor of the foreground pixel has a predetermined value.

3. The system of claim 1, wherein:

at least one of the plurality of pixels is a background pixel; and the processor sets the pixel color definition of the background pixel to be the background color definition of the background pixel without retrieving any of the plurality of definitions of mixed colors from the memory when the transparency factor of the background pixel has a predetermined value.

4. The system of claim 1, wherein:

the plurality of definitions of mixed colors are stored in the memory as an indexed table.

5. The system of claim 1, wherein:

the graphical image comprises an object; and the processor, in setting the pixel color definition of the at least one of the plurality of pixels, causes the object to exhibit antialiasing.

6. The system of claim 1, wherein:

the graphical image comprises an object; and the processor, in setting the pixel color definition of the at least one of the plurality of pixels, causes the object to exhibit transparency.

7. The system of claim 1, wherein:

the graphical image comprises an object; and the processor, in setting the pixel color definition of the at least one of the plurality of pixels, causes the object to exhibit motion blur.

8. The system of claim 1, wherein the processor causes the graphical image to be displayed on a computer monitor.

9. The system of claim 1, wherein the processor causes the graphical image to be displayed on a television.

10. The system of claim 1, wherein:

the graphical image comprises an object; and the processor, in setting the pixel color definition of the at least one of the plurality of pixels, causes the object to exhibit shadowing.

11. The system of claim 1, wherein the processor, in causing the plurality of definitions of mixed colors to be stored in the memory, calculates a definition of a mixed color from a combination of a definition of a foreground color, a definition of a background color, and a transparency factor, and stores the definition of the mixed color in the memory.

12. The system of claim 1, wherein the processor, in causing the plurality of definitions of mixed colors to be stored in the memory, loads a definition of a mixed color from a storage device and stores the definition of the mixed color in the memory.

13. The system of claim 1, wherein each of the transparency factor and the plurality of transparency factors is a fractional value that defines a desired mixture of a foreground color and a background color.

14. The system of claim 13, wherein the fractional value is selected from a group consisting of 0.0, 0.125, 0.25, 0.375, 0.5, 0.625, 0.75, 0.875, and 1.0.

15. The system of claim 1, wherein each of the pixel color definition, the foreground color definition, the background color definition, the plurality of definitions of mixed colors, the plurality of definitions of foreground colors, and the plurality of definitions or background colors defines a red component, a green component, and a blue component of a corresponding color.

16. The system of claim 15, wherein each of the red component, the green component, and the blue component of the corresponding color are defined as values in the range of 0 through 255.

17. A method for setting a pixel color definition of at least one of a plurality of pixels that form a graphical image, the at least one of the plurality of pixels each having a foreground color definition, a background color definition, and a transparency factor, the method comprising:

simultaneously storing in a memory a plurality of definitions of mixed colors, each of the plurality of definitions of mixed colors corresponding to a combination of at least one of a plurality of definitions of foreground colors, at least one of a plurality of definitions of background colors, and at least one of a plurality of transparency factors;

forming an index using a combination of the foreground color definition, the background color definition, and the transparency factor of the at least one of the plurality of pixels of the graphical image;

retrieving from the memory a selected definition of the plurality of definitions of mixed colors using the index; and setting the pixel color definition of the at least one of the plurality of pixels to be the selected definition of the plurality of definitions of mixed colors.

18. The method of claim 17, wherein at least one of the plurality of pixels is a foreground pixel, the method further comprising:

setting the pixel color definition of the foreground pixel to be the foreground color definition of the foreground pixel without retrieving any of the plurality of definitions of mixed colors from the memory when the transparency factor of the foreground pixel has a predetermined value.

19. The method of claim 17, wherein at least one of the plurality of pixels is a background pixel, the method further comprising:

setting the pixel color definition of the background pixel to be the background color definition of the background pixel without retrieving any of the plurality of definitions of mixed colors from the memory when the transparency factor of the background pixel has a predetermined value.

20. The method of claim 17, wherein:

the storing of the plurality of definitions of mixed colors comprises storing the plurality of definitions of mixed colors as an indexed table.

21. The method of claim 17, wherein:

the graphical image comprises an object; and the setting of the pixel color definition of the at least one of the plurality of pixels, causes the object to exhibit antialiasing.

22. The method of claim 17, wherein:

the graphical image comprises an object; and the setting of the pixel color definition of the at least one of the plurality of pixels, causes the object to exhibit transparency.

23. The method of claim 17, wherein:

the graphical image comprises an object; and the setting of the pixel color definition of the at least one of the plurality of pixels, causes the object to exhibit motion blur.

24. The method of claim 17, further comprising displaying the graphical image on a computer monitor.

25. The method of claim 17, further comprising displaying the graphical image on a television.

26. The method of claim 17, wherein:

the graphical image comprises an object; and the setting of the pixel color definition of the at least one of the plurality of pixels, causes the object to exhibit shadowing.

27. The method of claim 17, wherein the storing of the plurality of definitions of mixed colors in the memory comprises:

calculating a definition of a mixed color from a combination of a definition of a foreground color, a definition of a background color, and a transparency factor; and storing the definition of the mixed color in the memory.

28. The method of claim 17, wherein the storing of the plurality of definitions of mixed colors in the memory comprises:

loading a definition of a mixed color from a storage device; and storing the definition of the mixed color in the memory.

29. The method of claim 17, wherein each of the transparency factor and the plurality of transparency factors is a fractional value that defines a desired mixture of a foreground color and a background color.

30. The method of claim 29, wherein the fractional value is selected from a group consisting of 0.0, 0.125, 0.25, 0.375, 0.5, 0.625, 0.75, 0.875, and 1.0.

31. The method of claim 17, wherein each of the pixel color definition, the foreground color definition, the background color definition, the plurality of definitions of mixed colors, the plurality of definitions of foreground colors, and the plurality of definitions or background colors defines a red component, a green component, and a blue component of a corresponding color.

32. The method of claim 31, wherein each of the red component, the green component, and the blue component of the corresponding color are defined as values in the range of 0 through 255.

33. A graphic display system for setting a pixel color definition of at least one of a plurality of pixels that form a graphical image, the at least one of the plurality of pixels each having a foreground color definition, a background color definition, and a transparency factor, the system comprising:

a memory that simultaneously stores a plurality of definitions of mixed colors, each of the plurality of definitions of mixed colors having been selected from a set of usable color definitions and corresponding to a combination of at least one of a plurality of definitions of foreground colors, at least one of a plurality of definitions of background colors, and at least one of a plurality of transparency factors, wherein each of the set of usable color definitions corresponds to one of a subset of all colors that are capable of being displayed on a video display associated with the video system; and a processor that forms an index using a combination of the foreground color definition, the background color definition, and the transparency factor of the at least one of the plurality of pixels of the graphical image, that retrieves from the memory a selected definition of the plurality of definitions of mixed colors using the index, and that sets the pixel color definition of the at least one of the plurality of pixels to be the selected definition of the plurality of definitions of mixed colors.

34. The system of claim 33, wherein:

at least one of the plurality of pixels is a foreground pixel; and the processor sets the pixel color definition of the foreground pixel to be the foreground color definition of the foreground pixel without retrieving any of the plurality of definitions of mixed colors from the memory when the transparency factor of the foreground pixel has a predetermined value.

35. The system of claim 33, wherein:

at least one of the plurality of pixels is a background pixel; and the processor sets the pixel color definition of the background pixel to be the background color definition of the background pixel without retrieving any of the plurality of definitions of mixed colors from the memory when the transparency factor of the background pixel has a predetermined value.

36. The system of claim 33, wherein:

the plurality of definitions of mixed colors are stored in the memory as an indexed table.

37. The system of claim 33, wherein:

the graphical image comprises an object; and the processor, in setting the pixel color definition of the at least one of the plurality of pixels, causes the object to exhibit antialiasing.

38. The system of claim 33, wherein:

the graphical image comprises an object; and the processor, in setting the pixel color definition of the at least one of the plurality of pixels, causes the object to exhibit transparency.

39. The system of claim 33, wherein:

the graphical image comprises an object; and the processor, in setting the pixel color definition of the at least one of the plurality of pixels, causes the object to exhibit motion blur.

40. The system of claim 33, wherein the processor causes the graphical image to be displayed on a computer monitor.

41. The system of claim 33, wherein the processor causes the graphical image to be displayed on a television.

42. The system of claim 33, wherein:

the graphical image comprises an object; and the processor, in setting the pixel color definition of the at least one of the plurality of pixels, causes the object to exhibit shadowing.

43. The system of claim 33, wherein the processor, in causing the plurality of definitions of mixed colors to be stored in the memory, calculates a definition of a mixed color from a combination of a definition of a foreground color, a definition of a background color, and a transparency factor, and stores the definition of the mixed color in the memory.

44. The system of claim 33, wherein the processor, in causing the plurality of definitions of mixed colors to be stored in the memory, loads a definition of a mixed color from a storage device and stores the definition of the mixed color in the memory.

45. The system of claim 33, wherein each of the transparency factor and the plurality of transparency factors is a fractional value that defines a desired mixture of a foreground color and a background color.

46. The system of claim 45, wherein the fractional value is selected from a group consisting of 0.0, 0.125, 0.25, 0.375, 0.5, 0.625, 0.75, 0.875, and 1.0.

47. The system of claim 33, wherein each of the pixel color definition, the foreground color definition, the background color definition, the plurality of definitions of mixed colors, the plurality of definitions of foreground colors, and the plurality of definitions or background colors defines a red component, a green component, and a blue component of a corresponding color.

48. The system of claim 47, wherein each of the red component, the green component, and the blue component of the corresponding color are defined as values in the range of 0 through 255.

49. A method for setting a pixel color definition of at least one of a plurality of pixels that form a graphical image, the at least one of the plurality of pixels each having a foreground color definition, a background color definition, and a transparency factor, the method comprising:

simultaneously storing in memory a plurality of definitions of mixed colors, each of the plurality of definitions of mixed colors having been selected from a set of usable color definitions and corresponding to a combination of at least one of a plurality of definitions of foreground colors, at least one of a plurality of definitions of background colors, and at least one of a plurality of transparency factors, wherein each of the set of usable color definitions corresponds to one of a subset of all colors that are capable of being displayed on a video display associated with the video system;

forming an index using a combination of the foreground color definition, the background color definition, and the transparency factor of one of the plurality of pixels of the graphical image;

retrieving from the memory a selected definition of the plurality of definitions of mixed colors using the index; and setting the pixel color definition of the at least one of the plurality of pixels to be the selected definition of the plurality of definitions of mixed colors.

50. The method of claim 49, wherein at least one of the plurality of pixels is a foreground pixel, the method further comprising:

setting the pixel color definition of the foreground pixel to be the foreground color definition of the foreground pixel without retrieving any of the plurality of definitions of mixed colors from the memory when the transparency factor of the foreground pixel has a predetermined value.

51. The method of claim 49, wherein one of the plurality of pixels is a background pixel, the method further comprising:

setting the pixel color definition of the background pixel to the background color definition of the background pixel without retrieving any of the plurality of definitions of mixed colors from the memory when the transparency factor of the background pixel has a predetermined value.

52. The method of claim 49, wherein:

the storing of the plurality of definitions of mixed colors comprises storing the plurality of definitions of mixed colors as an indexed table.

53. The method of claim 49, wherein:

the graphical image comprises an object; and the setting of the pixel color definition of the at least one of the plurality of pixels, causes the object to exhibit antialiasing.

54. The method of claim 49, wherein:

the graphical image comprises an object; and the setting of the pixel color definition of the at least one of the plurality of pixels, causes the object to exhibit transparency.

55. The method of claim 49, wherein:

the graphical image comprises an object; and the setting of the pixel color definition of the at least one of the plurality of pixels, causes the object to exhibit motion blur.

56. The method of claim 49, further comprising displaying the graphical image on a computer monitor.

57. The method of claim 49, further comprising displaying the graphical image on a television.

58. The method of claim 49, wherein:

the graphical image comprises an object; and the setting of the pixel color definition of the at least one of the plurality of pixels, causes the object to exhibit shadowing.

59. The method of claim 49, wherein the storing of the plurality of definitions of mixed colors in the memory comprises:

calculating a definition of a mixed color from a combination of a definition of a foreground color, a definition of a background color, and a transparency factor; and storing the definition of the mixed color in the memory.

60. The method of claim 49, wherein the storing of the plurality of definitions of mixed colors in the memory comprises:

loading a definition of a mixed color from a storage device; and storing the definition of the mixed color in the memory.

61. The method of claim 49, wherein each of the transparency factor and the plurality of transparency factors is a fractional value that defines a desired mixture of a foreground color and a background color.

62. The method of claim 61, wherein the fractional value is selected from a group of 0.0, 0.125, 0.25, 0.375, 0.5, 0.625, 0.75, 0.875, and 1.0.

63. The method of claim 49, wherein each of the pixel color definition, the foreground color definition, the background color definition, the plurality of definitions of mixed colors, the plurality of definitions of foreground colors, and the plurality of definitions or background colors defines a red component, a green component, and a blue component of a corresponding color.

64. The method of claim 63, wherein each of the red component, the green component, and the blue component of the corresponding color are defined as values in the range of 0 through 255.

* * * * *